June 23, 1970

A. F. GALLISTEL ETAL 3,516,890

MULTIPLE FILM TABBING APPARATUS

Filed May 22, 1967

INVENTORS
ALBERT F. GALLISTEL
MYREL T. TIERNEY
BY Daniel R. Johnson
AGENT

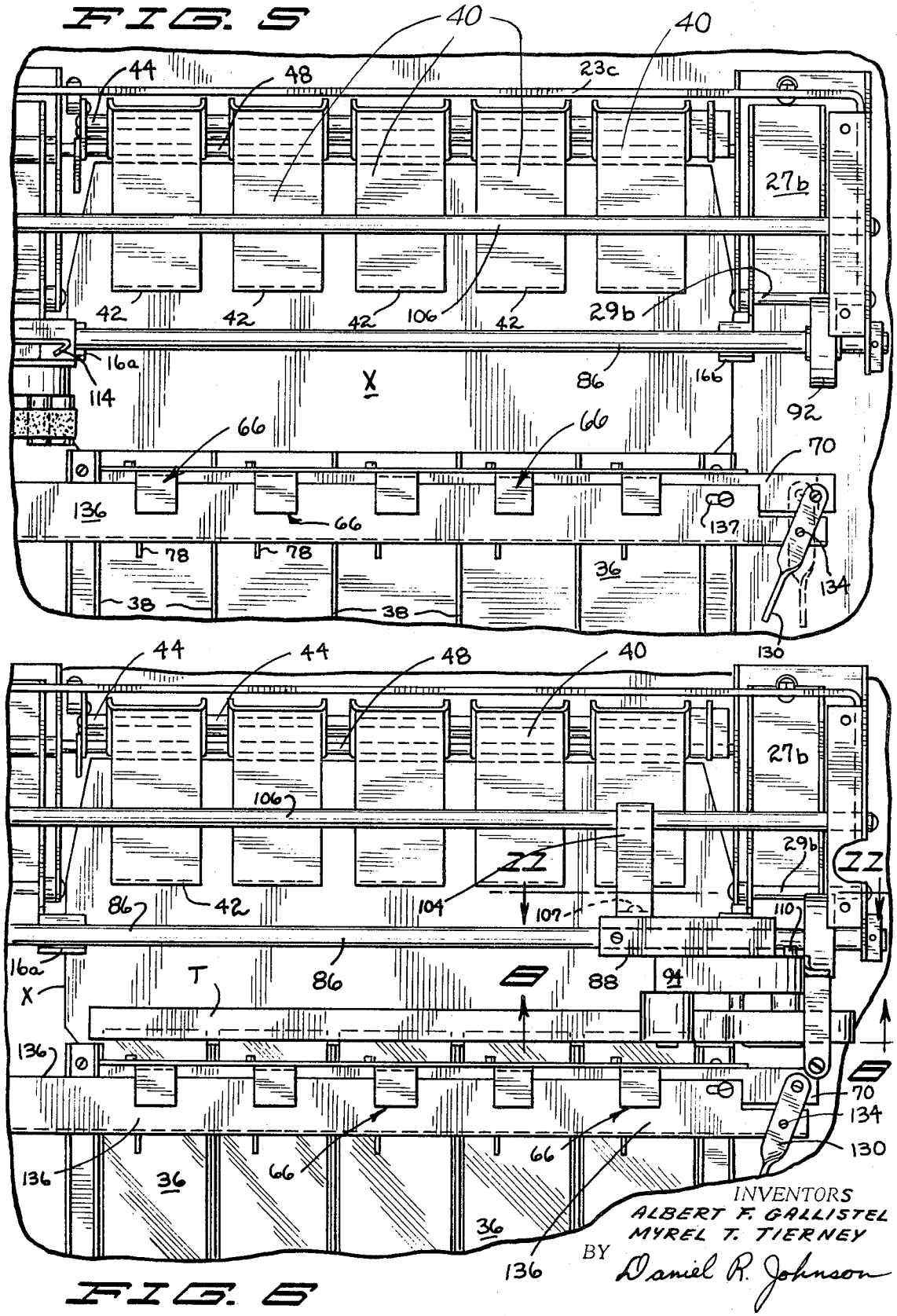

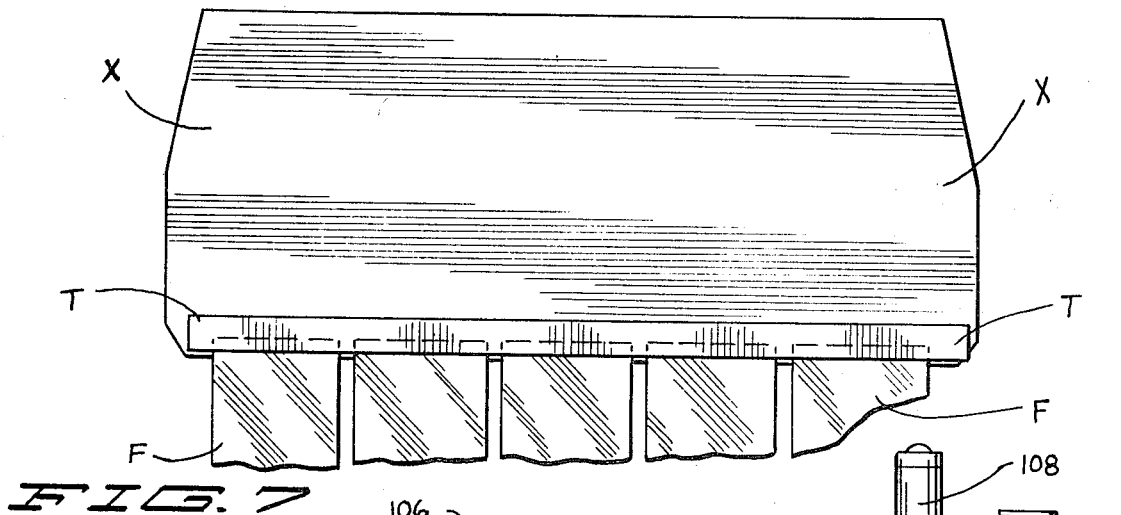
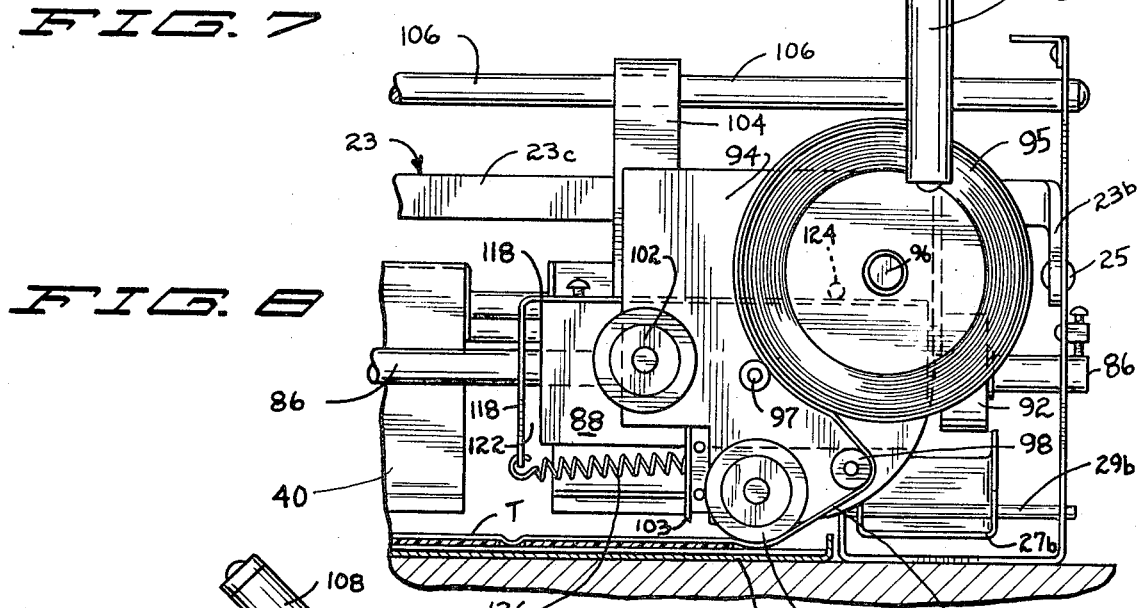
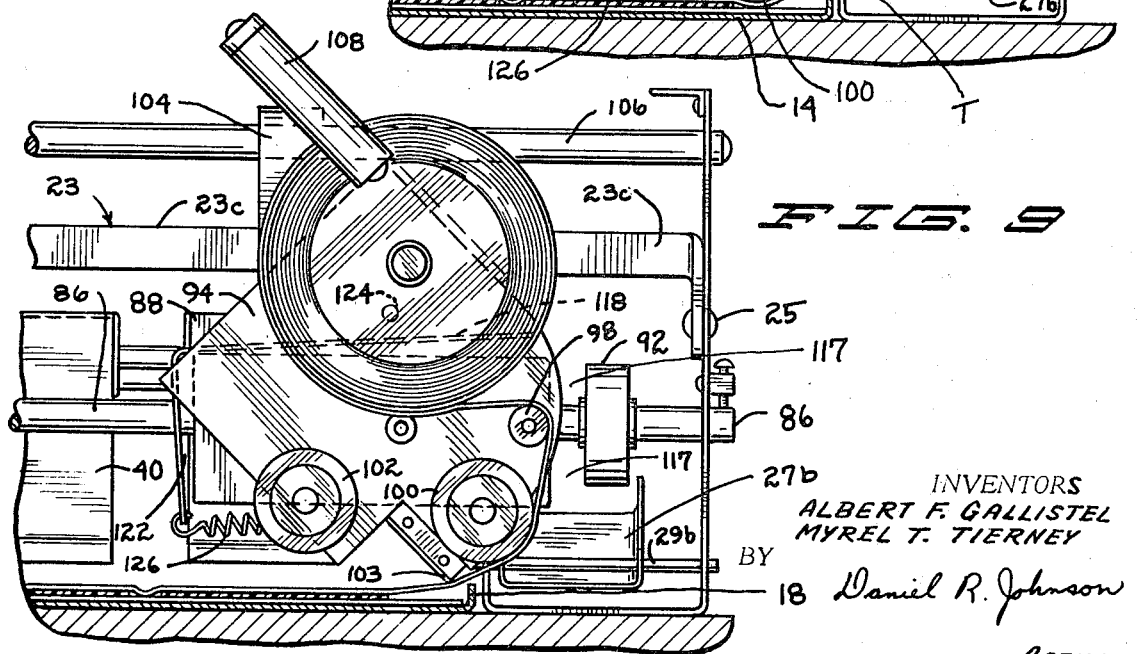
INVENTORS
ALBERT F. GALLISTEL
MYREL T. TIERNEY
BY Daniel R. Johnson
AGENT

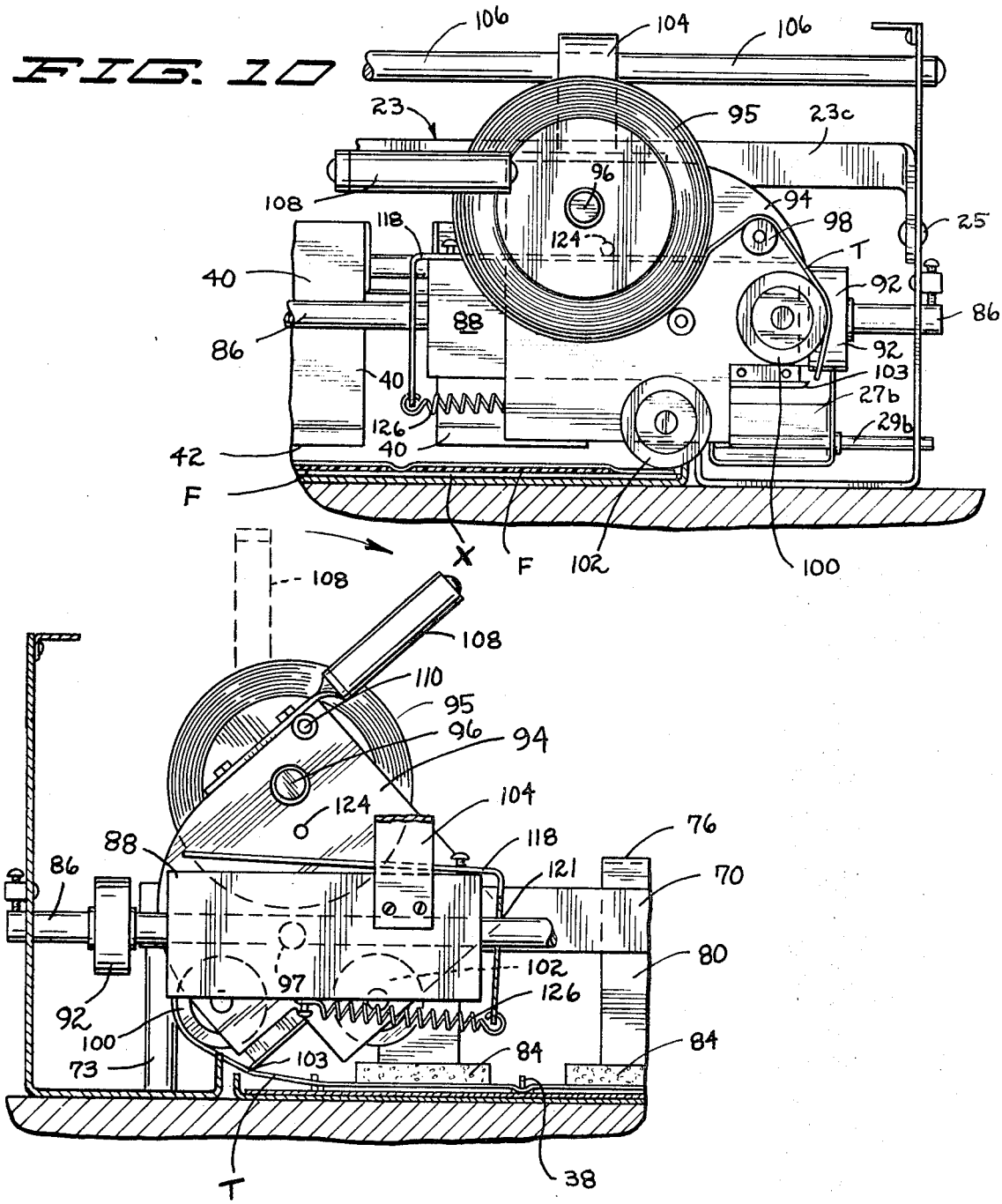

United States Patent Office 3,516,890
Patented June 23, 1970

3,516,890
MULTIPLE FILM TABBING APPARATUS
Albert F. Gallistel, Wayzata, and Myrel T. Tierney, Richfield, Minn., assignors to Pako Corporation, Minneapolis, Minn., a corporation of Minnesota
Filed May 22, 1967, Ser. No. 640,268
Int. Cl. G03d 13/00
U.S. Cl. 156—505                                           8 Claims

ABSTRACT OF THE DISCLOSURE

Apparatus for simultaneously securing the free ends of several film strips to a plastic tab, the tab being used to lead the film strips through a commercial photographic roller processor. A plastic tab is temporarily held in fixed position such that one edge of the tab partially underlies the free ends of five strips of film. Each film strip is positioned and individually clamped within film guideways such that they extend perpendicular to the edge of the tab. When a taping assembly is moved from left to right, a length of pressure sensitive tape from a tape dispenser tapes the films to the tab, a knife on the bottom of the taping assembly being used to cut the tape when the assembly reaches the right side of the machine. As the taping assembly is returned to its initial position on the left side of the machine, a lever mechanism is semi-automatically released, permitting the tab and films to be removed as a unit.

BACKGROUND OF THE INVENTION

In the photographic film developing industry, it is desirable to attach a leader tab to the end of a strip of film prior to the developing process. The tab provides the desired support for the film and facilitates transfer of the film strip throughout the numerous steps of the photographic developing process. The method and apparatus embodying the present invention have been developed to quickly apply a length of pressure sensitive tape to secure several rolls of film to a plastic tab whereby a single tab is used as a leader for several rolls of film. Thus, the use of multiple tabbing apparatus according to this invention achieves maximum production at minimum cost.

The components of the multiple film tabbing apparatus of the present invention include means for positioning and temporarily holding the plastic tab or leader in a fixed position on a flat surface, means for temporarily positioning and holding several film strips so their free ends partly overlie one edge of the tab, a taping assembly including a tape dispenser movable from left to right for applying a predetermined length of pressure sensitive tape along the marginal end portions of the film strips to thereby secure each of the film strips to the tab, a knife and roller assembly for cutting the tape and rolling down its loose end, means for returning the taping assembly to its initial start position and a semi-automatic lever mechanism for releasing the tab and film clamps. It is believed that this combination of elements and method of securing several film strips to a single tab is an entirely new concept and has not been suggested or disclosed by the prior art.

SUMMARY

The gist of the inventive concept resides not only in the provision of apparatus for securing film to a plastic leader tab, but also the provision of apparatus which permits several film strips to be simultaneously attached to such a tab. As stated above, the tape is applied to the marginal end portions of the film strips which partly overlie the tab and thus securely attaches the tab and the film strips together. Rather obvious advantages of a multiple film tabbing device lie in the increased production which is achieved and the reduction of tab costs. In addition, this method lends itself to accurate and quick order handling since the tab can be used to identify the films after they have been processed. Still another advantage lies in the fact that the pressure sensitive tape provides a very positive coupling of the tab with the film, yet presents no obstruction as the film and tab are being fed through the photographic roller processor.

BRIEF DESCRIPTION OF THE DRAWINGS

FIG. 5 is an enlarged plan view showing particularly the elements of the apparatus for positioning and clamping the tab and film strips.

FIG. 6 is a similar plan view as that of FIG. 5 and showing particularly the releasing lever and mechanism for releasing the tab and film clamps.

FIG. 7 is a plan view showing an application of the tape to join the plastic tab with five film strips.

FIG. 8 is an elevational view taken along the line 8—8 of FIG. 6.

FIG. 9 is a similar elevational view showing the operation of the taping assembly upon completion of its dispensing of a predetermined length of pressure sensitive tape.

FIG. 10 is an elevational view illustrating the roller and knife assembly of the tape slider assembly.

FIG. 11 is a view taken along the line 11—11 of FIG. 6.

FIG. 12 is an enlarged view taken along the line 12—12 of FIG. 1.

THE PREFERRED EMBODIMENT

The preferred embodiment is best understood by considering its structure in the light of the operational steps followed in operating the overall apparatus. Thus, the essential components of the multiple tabbing apparatus will be described in the order in which they are encountered in operating the device.

TAB ALIGNMENT MEANS

The tab alignment means serves a dual purpose: it helps position the tab X and also insures that the tab is held in a fixed position while the pressure sensitive tape is applied to the trailing edge of the tab. The term "trailing edge" contemplates the nearest edge of the tab when facing the machine. It is this edge which is used to attach the film strips F to the tab and hence represents the last or trailing portion of the tab when the same is fed through the photographic processor. The structure which comprises the tab alignment means includes a tab supporting tray 14, a left tab clamp 16a and a right tab clamp 16b. The tab supporting tray 14 serves as a horizontal bed for receiving a supply of the plastic tabs X. These tabs are placed in the tab tray 14 and small lip flanges 18 along the marginal edges of the tray assist the operator in aligning the tabs in proper position. The provision of these flanges 18 permits the tabs to be easily and quickly loaded, even under darkroom conditions.

Figure 2:
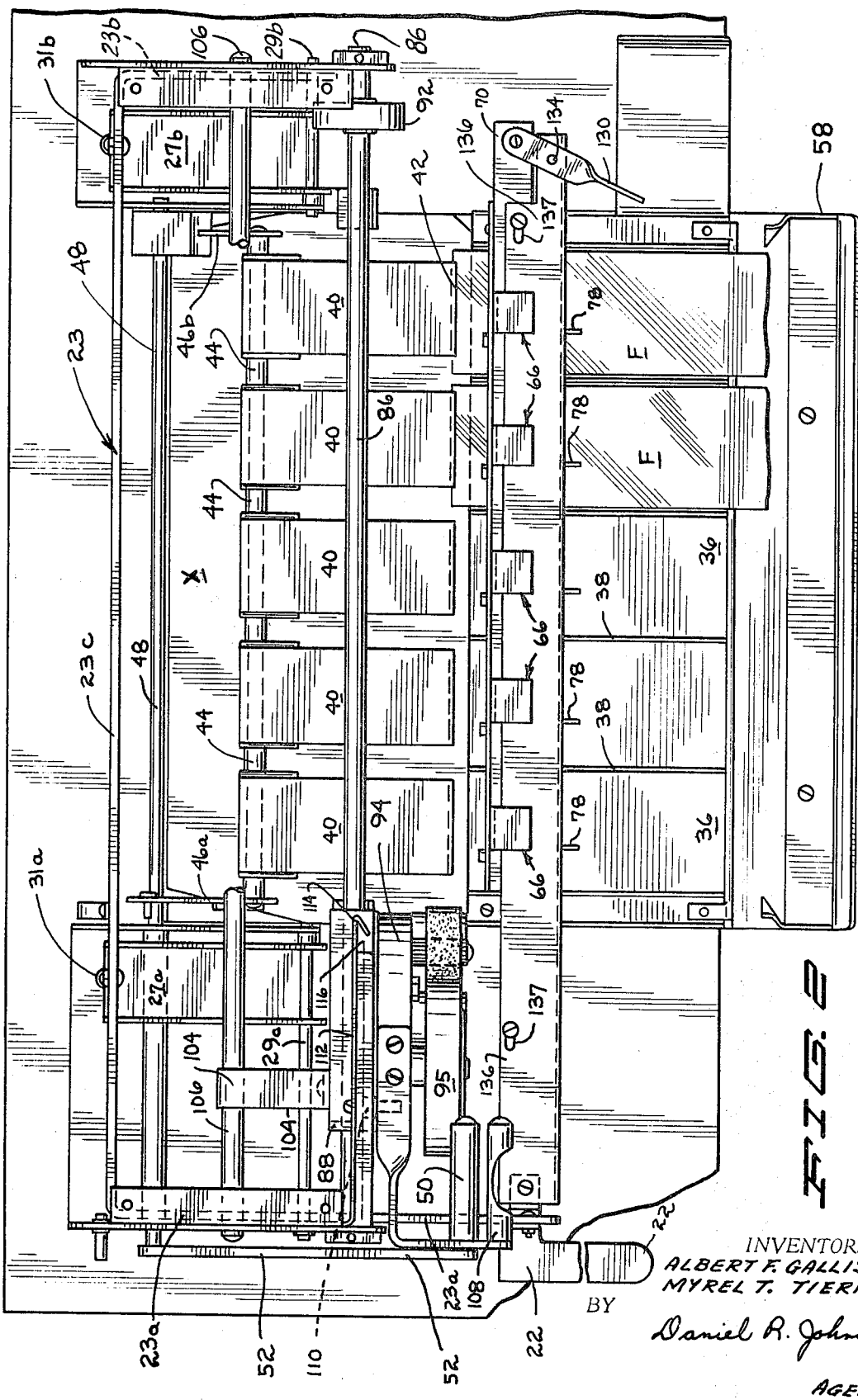
FIG. 2 is a plan elevational view of the overall apparatus.
Figure 3:
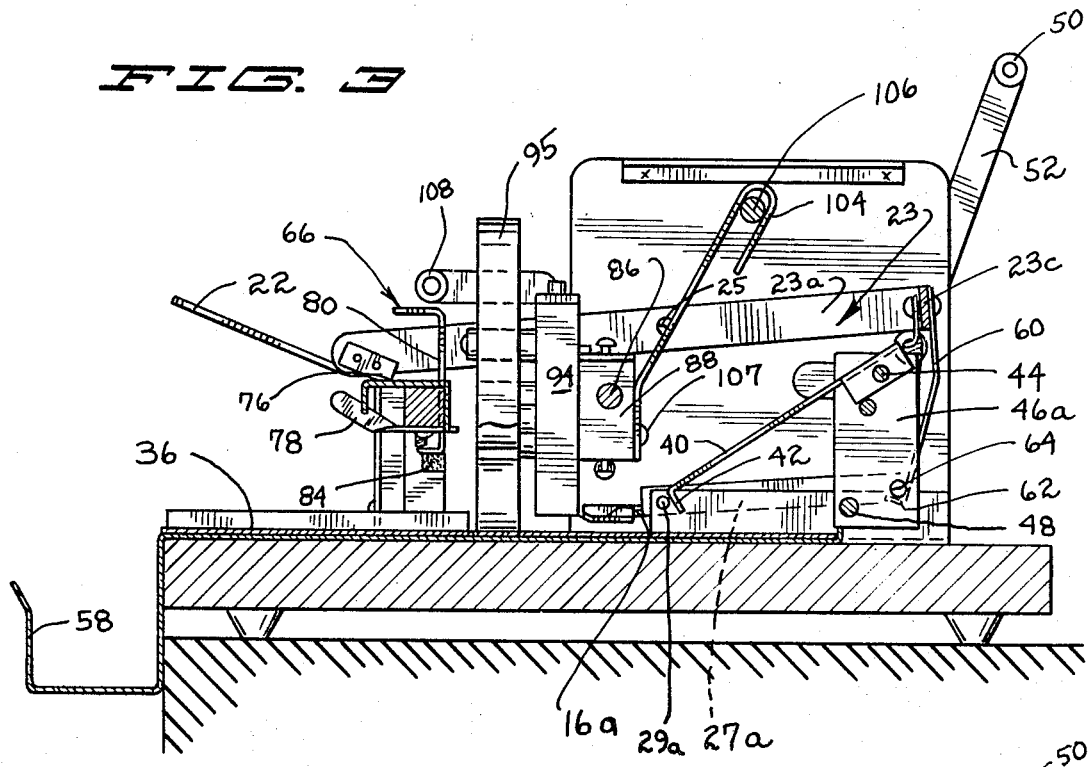
FIG. 3 is a cross sectional view taken along the line 3—3 of FIG. 1.
Figure 4:
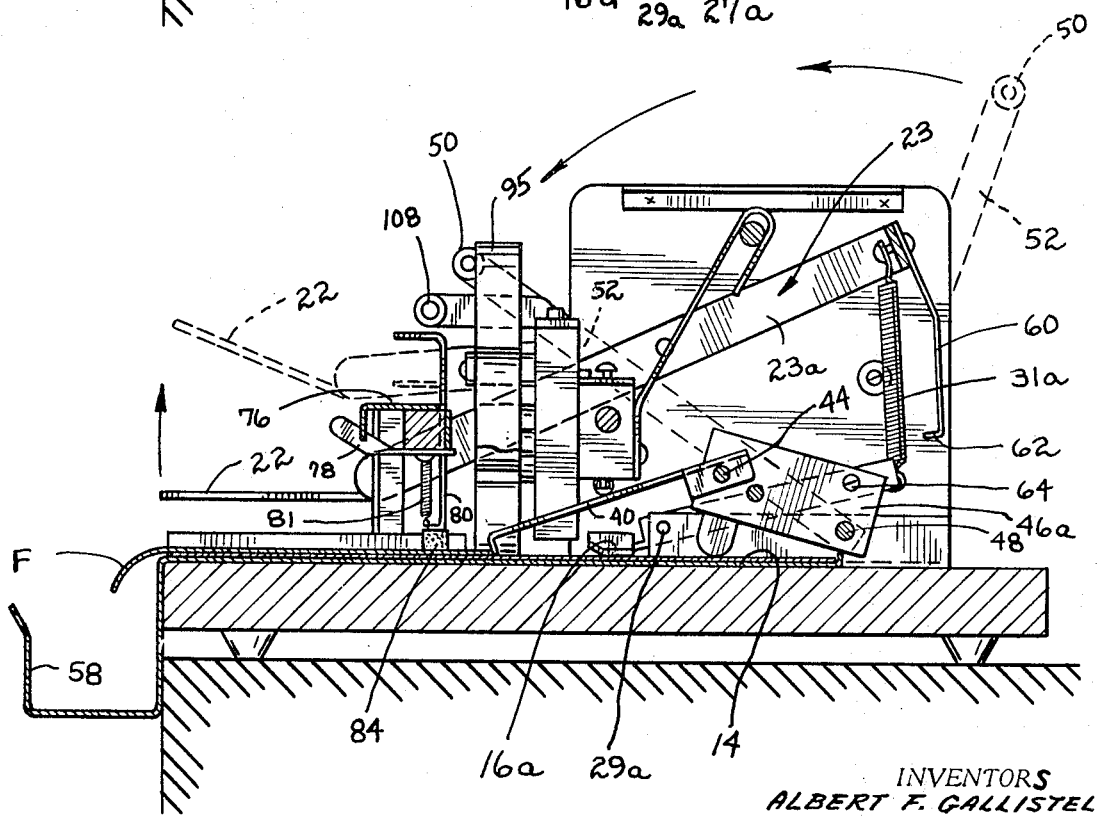
FIG. 4 is a side elevational view and showing in dotted illustration one phase of the operation of the device.

The tab clamps 16a and 16b are necessary to prevent any movement of the tab when the pressure sensitive tape is applied along its trailing edge. The tab clamps are shown oppositely situated along the lateral edges of the plastic tab X. The tab clamps move up and down and extend inwardly to partly overlie the lateral edge of the tab. Both tab clamps are actuated simultaneously through a lever mechanism which is best seen in FIGS. 2, 3 and 4. This mechanism includes a tab clamp handle 22 shown situated to the left of the machine. Handle 22 forms an integral part of a U-shaped member 23 which in turn pivots about a pair of opposing fulcrum pins 25. The left and right sides of the U-shaped member 23 are designated by the numerals 23a and 23b respectively, while the back member is designated by the numeral 23c. FIGS. 3 and 4 show that when the handle 22 is depressed, back member 23c of the U-shaped member 23 pivots upwardly about the pins 25. When this is done, the tab clamps 16a and 16b pivot downwardly and are depressed against the tab and firmly hold it in place. This is achieved through the action of a pair of channel levers 27a and 27b. The respective tab clamps 16a and 16b are shown formed as part of these channel levers, the latter being adapted to pivot about pivot pins 29a and 29b, respectively. Extension springs 31a and 31b are provided in conjunction with each of the channel levers and are shown coupled between the channel levers and the back member 23c of U-shaped member 23. Accordingly, as the tab clamp handle 22 is depressed, the U-shaped member 23 is pivoted upwardly, causing extension of the springs 31a and 31b. Since the springs are attached to the channel levers 27a and 27b, this will in turn cause the channel levers to be pivoted about their fulcrum points 29a and 29b to thereby cause the tab clamps 16a and 16b to be depressed into engagement with the tab X.

A spring loaded latch 34 is provided adjacent the tab clamp handle 22 for locking the handle and tab clamps in their depressed positions, as shown in the solid line illustration of FIG. 4.

FILM ALIGNMENT MEANS

The film alignment means is designed to insure proper positioning and holding of the film strips F preparatory to their being taped to the plastic tab. It is important to note that the film alignment means of the present invention also lends itself to use under darkroom conditions. In order to assure proper lateral positioning of the film strips F, a film tray 36 is shown having film guideways 38 and these guideways are suitably spaced to form a series of runways or paths for receiving the several film strips. For purposes of illustration, only two such film strips are shown in position between the guideways.

A second important consideration in aligning the film strips F is that their free ends are properly aligned with respect to the trailing edge of the plastic tab X. In this respect, it is preferred that each of the film strips overlie the trailing edge of the tab approximately one-half inch. It is also desirable that all film strips overlie the plastic tab an equal amount. To insure proper placement of the film strips on the tab, the film alignment means is shown having a series of film stops 40 corresponding with each of the incoming film strips. The film stops 40 are simultaneously movable from a released position where they are out of the way of the taping assembly to a position wherein their terminal ends abut the free ends of the incoming film strips and thus limit how far the film strips can extend over the tab. When the stops are in their forward position, the film strips overlie the trailing edge of the tab approximately one-half inch.

It suffices to describe the construction of only one of the film stops since they are all of identical structure. The forward ends 42 (nearest the operator) are formed with a downwardly turned lip which is designed to abut against the free end of the respective film strip. It will be apparent that this lip will not cause damage to the tab as the film stop slides over the top surface of the tab. The back end portion of the film stop is shown pivotally mounted to a stop bar 44 which extends between lever plates 46a and 46b. The lever plates 46a and 45b are in turn secured to pivot bar 48. Pivot bar 48 is actuated by film stop handle 50 formed on the upper end of lever arm 52. The linkage thus described consisting of the film stop handle 50, lever arm 52, pivot bar 48, lever plates 48a and 48b, and film stop bar 44, provide the means for simultaneously moving the film stops 40 from their released positions to a position wherein they limit how far the film strips extend over the tab. FIG. 5 shows the stops 40 in their released positions and FIG. 2 shows them pivoted forwardly.

The numeral 58 designates a receptacle for receiving the rolls of film which are being fed into the multiple tabbing apparatus.

A leaf spring 60 is also shown extending downwardly from the back member 23b of U-shaped member 23. The terminal end of this spring is shown having the inwardly extending lip 62 adapted to normally ride under a cross screw 64 shown mounted on the left lever plate 46a. When the tab clamp handle 22 is depressed by the operator, the spring 60 is swung upwardly and the action of the lower lip 62 riding on cross screw 64 is sufficient to pivot the film stops forwardly without actuation of the film stop handle 50. The operator can therefore semi-automatically throw the film stops 40 forwardly by merely depressing the film tab handle 22. Hence, when the tab clamp handle 22 is pushed down, the tab clamps hold the tab in place and the film stops 40 are moved into position.

Figure 1:
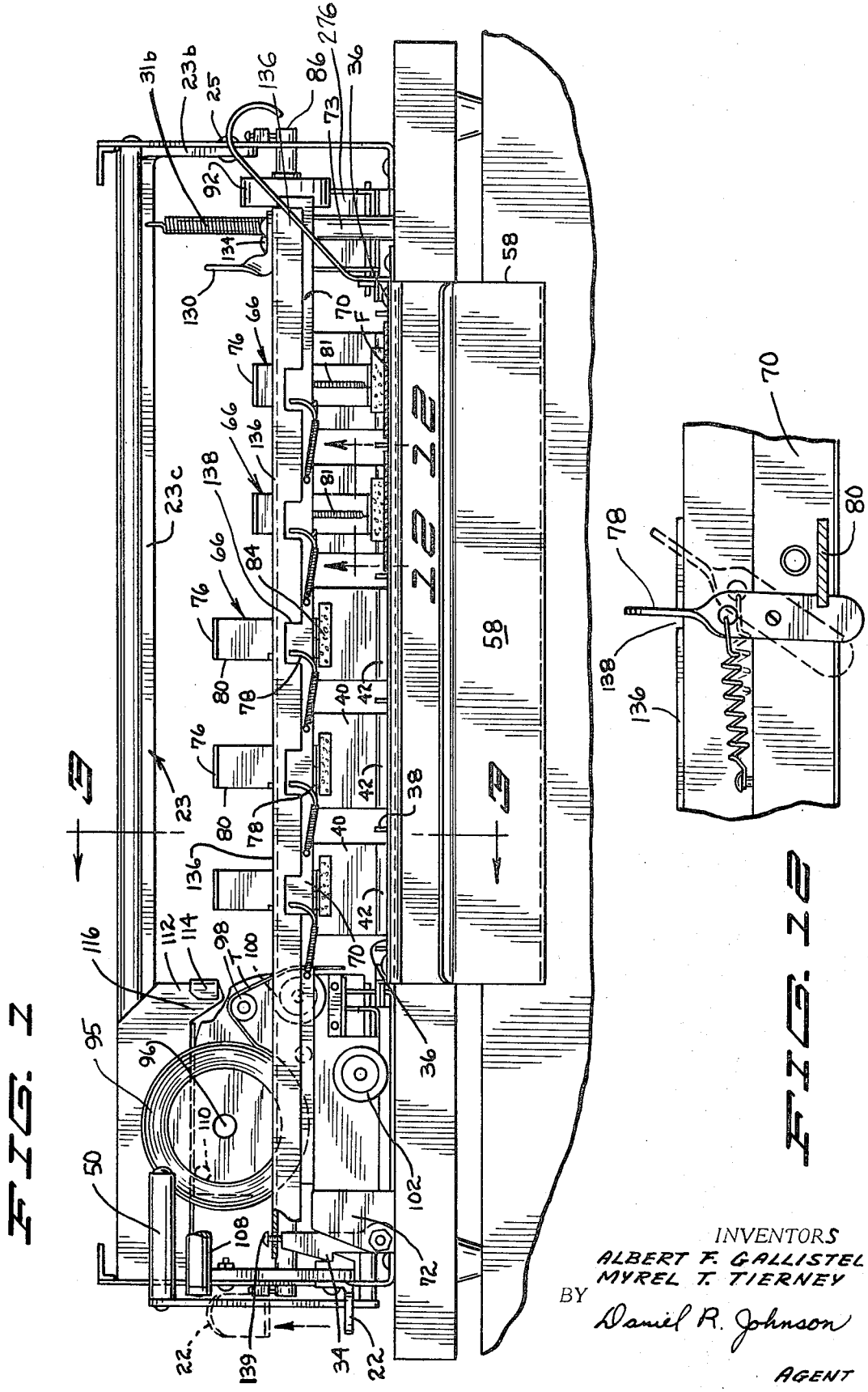
FIG. 1 is a front elevational view showing the multiple film tabbing apparatus in its normal operative position on a work surface.

As stated above, it is important that each film strip is held in a fixed position during the time that the tape is applied. This is achieved through the use of a series of film clamps 66 which are best seen in FIG. 1. These clamps are mounted on clamp support bar 70 which in turn extends between left vertical support block 72 and right vertical support block 73. Each film clamp 66 moves from a release position such as illustrated by the first three clamps of FIG. 1 to a depressed position illustrated by the two clamps on the right of FIG. 1, the depressed position being one which holds the film tightly against the film tray 36. Each clamp is depressed by pushing a top flange surface 76 and a spring latch assembly 78 (shown in detail in FIG. 12) permits the film clamps to be locked in their depressed positions. When a film clamp 66 is depressed, the spring loaded latch assembly engages a notch at 83 provided in a body member 80 of the film clamp and locks the same in place. As seen in FIG. 12, the latch assembly can be manually pivoted to the dotted line position to release the clamp. The clamps snap back to their released positions through the action of springs 81 which are coupled between the clamps and clap support bar 70. It should also be pointed out that each of the clamps 66 is provided with a rubber or sponge foot 84 which is compressible upon contact with the film and thus achieves the desired gripping action without causing damage to the film strip itself.

THE TAPING ASSEMBLY

The taping assembly moves from a leftward start position to a rightward extended position, its stroke being for the purpose of applying a predetermined length of pressure sensitive tape along the trailing edge of the tab and thereby secure the overlying free ends of the film strips to the tab. When the taping assembly reaches the end of its stroke on the right of the machine, the tape is severed and the loose end of the tape is rolled down. Then the assembly is returned to its initial start position on the left.

The components of the taping assembly include a tape assembly slide bar 86 which in turn serves as a support for a rectangular carriage 88. Carriage 88 slides on bar 86 and its rectilinear movement is limited on the left by a carriage stop washer 90 and on the right by a carriage stop collar 92. A taping block 94 is shown pivotally mounted at 97 to the carriage 88, the purpose of which will be described below. The taping block 94 serves as a support for a tape supply roller 95 which is shown mounted for rotation about axis 96. Block 94 also supports tape guide roller 98, pressure applying roller 100 and roll-down roller 102. The numeral 103 designates a knife edge carried by the taping block 94 and is used in severing the tape when the taping assembly reaches the end of its stroke.

FIG. 1 shows the taping assembly in its initial start position. The pressure sensitive tape T is draped over tape guide roller 98 and extends forwardly over pressure applying roller 100. In this position, the tape has its adhesive side up and unravels from supply roller 96 as the latter rotates in a counter-clockwise direction.

To prevent any pivoting of the carriage 88 about the slide bar 86, there is provided a rail strap 104 which overlaps and rides on an upper guide rail 106, the latter extending parallel to bar 86. Strap 104 is secured to carriage 88 by screws 107.

The construction of the taping assembly, and especially the taping block 94, is best understood by considering the operational steps carried out in dispensing each length of tape. The initial start position of the carriage 88 and taping block 94 is as shown in FIG. 2. The operator grasps the taping handle 108 which is attached to the carriage 108, and pushes the same to the right. As seen in FIG. 1 and FIG. 2, this causes a small cam follower 110 to roll on the underside of a cam plate 112 situated on the left side of the machine. This cam follower 110 is shown on the back side of taping block 94 and hence controls the pivotal action of the block as it passes through its operational sequence. The provision of this cam and follower assembly permits the carriage 88 to be moved to the right until the cam roller 110 hits a carriage stop 114 formed on cam plate 112. At this point, an adjacent opening or cutout 116 formed on cam plate 112 allows the taping block to be pivoted 90 degrees upwardly as the follower 110 moves out of engagement with the underside of the cam plate 112. When the taping block 94 is pivoted 90 degrees upwardly, the follower 110 swings up through opening 116 and assumes a position ahead of the carriage stop 114. In this position, the tape has been oriented so its adhesive side is down and the free end of the tape has made its initial contact with the tab X. Since the follower 110 has cleared the carriage stop 114, the carriage then moves to the right until the taping block 94 strikes collar stop 92. FIG. 8 shows the carriage and taping block in this extended position. Note that pressure applying roller 100 is designed to roll over the top of the tape to insure that it is securely applied.

After the carriage 88 and taping block 94 have assumed the position of FIG. 8, the operator pivots handle 108 to the left in the manner of FIG. 9. FIG. 9 shows the block in an intermediate position, although the block 94 is normally pivoted 90 degrees until handle 108 again assumes its horizontal position. It should be noted in FIG. 9 that a clearance between the taping block and right collar stop 92 is formed at 117 as the taping block is pivoted to the left. This clearance permits further rightward travel of the carriage 88. Accordingly, the operator pivots handle 108 a full 90 degrees and then pushes to the right until the carriage 88 strikes stop collar 92. It will be apparent that pivoting the taping block 94 and moving the carriage 88 to the right has caused the knife edge 103 to sever the tape and has also caused roll-down roller 102 to roll down the loose end of the tape. FIG. 10 shows this position with the taping operation completed.

After the taping assembly has reached the end of its stroke (FIG. 10), the operator then pushes handle 108 to the left and the carriage is returned to its initial position of FIG. 1. In order to allow the cam roller 110 to clear carriage stop 114 without again pivoting the taping block upwardly, the cam plate 112 and carriage stop 114 have been specially designed. First, the cam stop 114 is shown presenting an inclined surface as the follower 110 strikes it upon the return stroke of the carriage 88. Secondly, the cam plate is composed of a spring steel which allows it to flex inwardly enough to allow the follower 110 to pass over stop 114. Thus, the inclined surface of stop 114 and the slight flexing of the cam plate combine to permit the full return of the taping assembly without pivoting the taping block 94.

A carriage braking mechanism is disclosed for the purpose of braking the carriage 88 on slide bar 86 when the taping block 94 is being pivoted. This braking mechanism includes L-shaped member 118 which extends over the top of carriage 88 and has its short end bored at 121 to receive slide bar 86. As seen in FIG. 10 and FIG. 11, the L-member is adapted for limited pivotal movement because the bore 121 is made slightly larger than the outside diameter of bar 86. Also, clearance is provided at 122 between the short end of L-shaped member 118 and the forward end of carriage 88. FIG. 10 shows the braking mechanism in its released position. A brake release pin 124 situated on the back side of taping block 94 holds the long end of L-shaped member 118 down against the top surface of the carriage 88. When the taping block 94 is pivoted, the pin 124 moves upwardly to thereby release the member 118 through the action of a brake spring 126. Spring 126 extends between the lower end of member 118 and the bottom of carriage 88. FIG. 11 shows the braking mechanism in its engaged position, i.e., the member 118 has pivoted upwardly and the friction of the bore 121 against bar 86 is sufficient to prevent rectilinear movement of the carriage 88 during the interval in which the taping block 94 is pivoted. When the taping block 94 has been fully pivoted to the position such as shown in FIG. 8, the braking mechanism is again released as pin 124 depresses the L-shaped member 118.

TAB AND FILM RELEASE MECHANISM

A lever mechanism is provided to simultaneously release the tab clamps 16a and 16b together with all the film clamps 66. For this purpose, there is shown release lever 130, located on top of right support block 73 and which pivots about the vertical axis 132. FIGS. 1 and 5 show the release lever 130 coupled at 134 to a slide plate 136 which extends coextensively with the clamp support bar 70. Slide plate 136 is slotted at 137 and is thereby adapted for limited lengthwise movement atop the clamp support bar 70. When release lever 130 is moved to the dotted line position of FIG. 5, the slide plate 136 moves to the right a distance sufficient to release all the spring latch assemblies 78 which lock the film clamps 66. As best seen in FIG. 1, the slide plate 136 includes cutouts 138 which provide the desired clearance for manual operation of the individual latch assemblies 78. However, as slide plate 136 is actuated to the right, the leftward edges of the cutouts 138 strike the lever arms of the latch assemblies 78 and release the same. Accordingly, film clamps 66 are then released and move to their raised positions.

FIG. 1 shows the far left end of slide plate 136 being slotted to receive an upright connector 139 supported on the top of the tab clamp latch 34 and which in turn locks the tab clamp handle 22 in its depressed position. When slide plate 136 is actuated to the right, the connector is pulled to the right, causing latch 34 to pivot sufficient to release the tab clamp handle 22. Thus, the tab handle 22 swings up and tab clamps 16a and 16b are released. Hence, actuation of release lever 130 simultaneously releases all of the film clamps 66 and the tab clamps 16a and 16b.

OPERATION

Although the operation of the device has been essentially described above, the sequential steps will be repeated to summarize its overall operation. To initially place the tabs X in the tab tray 14, the operator pushes the film stop handle 50 back and the film stops 40 assume the position shown in FIG. 5, and the operator slides the tab into position by slipping it under the film clamps 66 and tab clamps 16a and 16b. The operator makes sure the back or leading edge of the tab is flush against the back lip flange 18 of the tab supporting tray 14. The tab clamp handle 22 is then pushed down to lock the tab in place and to move the film stops into their forward positions, shown in FIG. 2. The operator then slides the free end of one of the film strips forward until it hits the film stop 40. The film is then locked in place by depressing the film clamp 66. The same procedure is followed in aligning each of the other film strips. When this is done, the tab and film strips are locked in place and ready for the taping operation.

The taping operation is commenced by raising the film stop handle 50 which moves the film stops 40 back to their initial position. The operator then grasps the taping handle 108 and slides the taping assembly to the right until it stops. By lifting upwardly on the taping handle 108, the taping block 94 is pivoted 90 degrees and slides the taping assembly over the films and tab until it hits the right stop collar 92. To cut the tape and to roll down its loose end, the operator lowers the handle 108 and again slides it to the right until it hits the stop collar 92. When this step is done, the taping operation is complete and the taping assembly may be slid back to its position on the left side of the machine. To release the tab and the film strips attached thereto, the operator pushes the release lever 130 to the right, to release the tab and film clamps as described above. The tab and attached films are removed by pulling the tab straight back. FIG. 7 shows the tab and attached films removed from the multiple tabbing apparatus, and ready for feeding into the photographic processor.

We claim:
1. Apparatus for securing the free ends of several film strips to a plastic tab having a leading edge and a trailing edge comprising:
   (a) tab alignment means for temporarily positioning and holding the plastic tab in a tape applying position;
   (b) film alignment means for temporarily positioning and holding each of said film strips in tape applying position wherein the free ends of each of said film strips partially overlie the trailing edge of said plastic tab;
   (c) a taping assembly movable from a start position to an extended position, said taping assembly being adapted to dispense a predetermined length of pressure sensitive tape along the trailing edge of said tab, the tape being applied so it partially overlies the marginal end portions of said film strips;
   (d) a knife and roller assembly carried by said taping assembly for severing the tape and rolling down its loose end when said taping assembly assumes its extended position; and
   (e) means for releasing said tab and film alignment means to thereby permit removal of the tab and film strips secured thereto.
2. The structure set forth in claim 1 and said tab alignment means including:
   (a) a substantially horizontally disposed tray for supporting a supply of tabs therein; and
   (b) a pair of lever actuated tab clamps which are simultaneously movable from a released position out of engagement with said tabs to an engaged position compressing said tabs against said tab supporting tray.
3. The structure set forth in claim 1 and said film alignment means including:
   (a) a film supporting tray having a series of film guideways adapted to facilitate proper lateral positioning of said film strips in their tape applying positions;
   (b) a series of lever actuated film stops for limiting the forward placement of said film strips within said film guideways; and
   (c) a series of individually actuated film clamping means, each of which are movable from a released position out of engagement with their respective film strip to an engaged position holding said film strip in fixed position against said film supporting tray.
4. The structure set forth in claim 1 and said taping assembly including:
   (a) a cross bar extending along a line parallel to the trailing edge of said tab when the same is in its tape applying position;
   (b) carriage means slidable upon said cross bar;
   (c) a taping block carried by said carriage means;
   (d) a tape supply roller carried by said taping block and being adapted for rotation about an axis transverse to the line of travel of said taping block; and
   (e) a pressure applying roller.
5. The structure of claim 4 and said taping block is adapted for limited pivotal movement about an axis transverse to the axis of said cross bar, said taping block combining with said pressure applying roller to orient each length of tape with the adhesive side down.
6. The structure of claim 5 and said taping assembly including a cam and follower means controlling the pivotal action of said taping block.
7. The structure of claim 4 wherein said carriage means includes braking means adapted to prevent movement of said carriage means on said cross bar, said braking means being responsive to the pivotal movement of said taping block.
8. The structure set forth in claim 3 and said apparatus includes a lever mechanism for simultaneously releasing all of said film clamps together with said tab clamps.

References Cited

UNITED STATES PATENTS 3,345,238  10/1967  Vanoni _____ 156—505

BENJAMIN A. BORCHELT, Primary Examiner

S. C. BENTLEY, Assistant Examiner

U.S. Cl. X.R.

156—530